(12) United States Patent
Ryge et al.

(10) Patent No.: US 8,401,147 B2
(45) Date of Patent: Mar. 19, 2013

(54) MULTIPLE SCREEN DETECTION SYSTEMS

(75) Inventors: Peter Ryge, Carlsbad, CA (US); Ronald Hughes, Garden Grove, CA (US); Andreas F. Kotowski, Rancho Palos Verdes, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 13/408,181

(22) Filed: Feb. 29, 2012

(65) Prior Publication Data

US 2012/0217408 A1 Aug. 30, 2012

Related U.S. Application Data

(63) Continuation of application No. 13/047,696, filed on Mar. 14, 2011, now Pat. No. 8,148,693, and a continuation-in-part of application No. 12/262,631, filed on Oct. 31, 2008, now Pat. No. 8,003,949.

(60) Provisional application No. 61/313,773, filed on Mar. 14, 2010, provisional application No. 60/984,640, filed on Nov. 1, 2007.

(51) Int. Cl.
*G01N 23/04* (2006.01)
*G01T 1/20* (2006.01)

(52) U.S. Cl. ...................... 378/57; 250/361 R

(58) Field of Classification Search .............. 250/361 R, 250/362, 367, 458.1, 493.1, 504 R; 378/57, 378/87
See application file for complete search history.

(56) References Cited

U.S. PATENT DOCUMENTS

| | | | |
|---|---|---|---|
| 3,678,278 A | 7/1972 | Peil | |
| 3,780,291 A | 12/1973 | Stein et al. | |
| 3,790,799 A | 2/1974 | Stein et al. | |
| 3,843,881 A | 10/1974 | Barton, Jr. et al. | |
| 3,884,816 A | 5/1975 | Takahashi | |
| RE28,544 E | 9/1975 | Stein et al. | |
| 3,919,467 A | 11/1975 | Peugeot | |
| 3,924,064 A | 12/1975 | Nomura et al. | |
| 4,020,346 A | 4/1977 | Dennis | |
| 4,031,545 A | 6/1977 | Stein et al. | |
| 4,047,035 A | 9/1977 | Dennhoven et al. | |
| 4,070,576 A | 1/1978 | Cobb | |
| 4,112,301 A | 9/1978 | Annis et al. | |
| 4,139,771 A | 2/1979 | Dennhoven et al. | |
| 4,160,165 A | 7/1979 | McCombs et al. | |
| 4,179,100 A | 12/1979 | Sashin et al. | |
| 4,196,352 A | 4/1980 | Berninger et al. | |

(Continued)

FOREIGN PATENT DOCUMENTS

| | | |
|---|---|---|
| EP | 0261984 | 3/1988 |
| EP | 1200931 | 5/2002 |

OTHER PUBLICATIONS

International Search Report PCT/US08/81988, May 7, 2009, Rapiscan Systems.
International Search Report PCT/US08/88345, Apr. 3, 2009, Rapiscan Security Products.

*Primary Examiner* — Mark R Gaworecki
(74) *Attorney, Agent, or Firm* — Novel IP

(57) ABSTRACT

The present specification discloses an improved detection system employing multiple screens for greater detection efficiency. More particularly, a first enclosure has two adjacent walls, each with interior surfaces, a first end and a second end. The first ends of the two adjacent walls are connected at an angle to form an interior and the second ends of the two adjacent walls are connected to a semi-circular housing. At least one substrate, positioned on each of the interior surfaces of the adjacent walls, has an active area for receiving and converting electromagnetic radiation into light. A photodetector, positioned in the interior portion of the semi-circular housing, has an active area responsive to the light.

12 Claims, 14 Drawing Sheets

U.S. PATENT DOCUMENTS

| | | |
|---|---|---|
| 4,200,800 A | 4/1980 | Swift |
| 4,208,577 A | 6/1980 | Wang |
| 4,221,967 A | 9/1980 | Wang |
| 4,228,353 A | 10/1980 | Johnson |
| 4,228,357 A | 10/1980 | Annis |
| 4,242,583 A | 12/1980 | Annis et al. |
| 4,242,588 A | 12/1980 | Silk et al. |
| 4,260,898 A | 4/1981 | Annis |
| 4,298,800 A | 11/1981 | Goldman |
| 4,303,830 A | 12/1981 | Heinzelmann et al. |
| 4,342,914 A | 8/1982 | Bjorkholm |
| 4,349,739 A | 9/1982 | Annis |
| 4,366,382 A | 12/1982 | Kotowski |
| 4,366,576 A | 12/1982 | Annis |
| 4,389,729 A | 6/1983 | Stein |
| 4,414,682 A | 11/1983 | Annis et al. |
| 4,422,177 A | 12/1983 | Mastronardi et al. |
| 4,426,721 A | 1/1984 | Wang |
| 4,454,605 A | 6/1984 | DeLucia |
| 4,472,822 A | 9/1984 | Swift |
| 4,503,332 A | 3/1985 | Annis |
| 4,514,691 A | 4/1985 | De Los Santos et al. |
| 4,535,245 A | 8/1985 | Zonneveld et al. |
| 4,549,307 A | 10/1985 | Macovski |
| 4,586,441 A | 5/1986 | Zekich |
| 4,598,415 A | 7/1986 | Luccio et al. |
| 4,672,837 A | 6/1987 | Cottrell, Jr. |
| 4,711,994 A | 12/1987 | Greenberg |
| 4,736,401 A | 4/1988 | Donges et al. |
| 4,756,015 A | 7/1988 | Doenges et al. |
| 4,759,047 A | 7/1988 | Donges et al. |
| 4,768,214 A | 8/1988 | Bjorkholm |
| 4,783,794 A | 11/1988 | Dietrich |
| 4,799,247 A | 1/1989 | Annis et al. |
| 4,807,637 A | 2/1989 | Bjorkholm |
| 4,809,312 A | 2/1989 | Annis |
| 4,817,121 A | 3/1989 | Shimizu et al. |
| 4,819,256 A | 4/1989 | Annis et al. |
| 4,821,023 A | 4/1989 | Parks |
| 4,825,454 A | 4/1989 | Annis et al. |
| 4,839,913 A | 6/1989 | Annis et al. |
| 4,845,769 A | 7/1989 | Burstein et al. |
| 4,864,142 A | 9/1989 | Gomberg |
| 4,870,670 A | 9/1989 | Geus |
| 4,884,289 A | 11/1989 | Glockmann et al. |
| 4,890,310 A | 12/1989 | Umetani et al. |
| 4,893,015 A | 1/1990 | Kubierschky et al. |
| 4,899,283 A | 2/1990 | Annis |
| 4,974,247 A | 11/1990 | Friddell |
| 4,979,137 A | 12/1990 | Gerstenfeld et al. |
| 5,007,072 A | 4/1991 | Jenkins et al. |
| 5,022,062 A | 6/1991 | Annis |
| 5,033,073 A | 7/1991 | Friddell |
| 5,039,981 A | 8/1991 | Rodriguez |
| 5,044,002 A | 8/1991 | Stein |
| 5,084,619 A | 1/1992 | Pfeiler et al. |
| 5,115,459 A | 5/1992 | Bertozzi |
| 5,127,030 A | 6/1992 | Annis et al. |
| 5,132,995 A | 7/1992 | Stein |
| 5,156,270 A | 10/1992 | Kachel et al. |
| 5,179,581 A | 1/1993 | Annis |
| 5,181,234 A | 1/1993 | Smith |
| 5,182,764 A | 1/1993 | Peschmann et al. |
| 5,224,144 A | 6/1993 | Annis |
| 5,243,693 A | 9/1993 | Maron |
| 5,247,561 A | 9/1993 | Kotowski |
| 5,253,283 A | 10/1993 | Annis et al. |
| 5,260,982 A | 11/1993 | Fujii et al. |
| 5,313,511 A | 5/1994 | Annis et al. |
| 5,367,552 A | 11/1994 | Peschmann |
| 5,397,986 A | 3/1995 | Conway et al. |
| 5,420,905 A | 5/1995 | Bertozzi |
| 5,463,224 A | 10/1995 | Burstein et al. |
| 5,483,569 A | 1/1996 | Annis |
| 5,490,218 A | 2/1996 | Krug et al. |
| 5,503,424 A | 4/1996 | Agopian |
| 5,524,133 A | 6/1996 | Neale et al. |
| 5,579,360 A | 11/1996 | Abdel-Mottaleb |
| 5,590,057 A | 12/1996 | Fletcher et al. |
| 5,600,303 A | 2/1997 | Husseiny et al. |
| 5,600,700 A | 2/1997 | Krug et al. |
| 5,602,893 A | 2/1997 | Harding |
| 5,642,393 A | 6/1997 | Krug et al. |
| 5,642,394 A | 6/1997 | Rothschild |
| 5,660,549 A | 8/1997 | Witt, III |
| 5,666,393 A | 9/1997 | Annis |
| 5,699,400 A | 12/1997 | Lee et al. |
| 5,764,683 A | 6/1998 | Swift et al. |
| 5,773,829 A | 6/1998 | Iwanczyk et al. |
| 5,796,110 A | 8/1998 | An et al. |
| 5,838,758 A | 11/1998 | Krug et al. |
| 5,882,206 A | 3/1999 | Gillio |
| 5,966,422 A | 10/1999 | Dafni et al. |
| 5,974,111 A | 10/1999 | Krug et al. |
| 6,018,562 A | 1/2000 | Willson |
| 6,044,353 A | 3/2000 | Pugliese, III |
| 6,094,472 A | 7/2000 | Smith |
| 6,137,895 A | 10/2000 | Al-Sheikh |
| 6,269,142 B1 | 7/2001 | Smith |
| 6,278,115 B1 | 8/2001 | Annis et al. |
| 6,298,603 B1 | 10/2001 | Diaz |
| 6,301,327 B1 | 10/2001 | Martens et al. |
| 6,308,644 B1 | 10/2001 | Diaz |
| 6,315,308 B1 | 11/2001 | Konopka |
| RE37,467 E | 12/2001 | Brasch et al. |
| 6,366,203 B1 | 4/2002 | Burns |
| 6,370,222 B1 | 4/2002 | Cornick, Jr. |
| 6,393,095 B1 | 5/2002 | Robinson |
| 6,484,650 B1 | 11/2002 | Stomski |
| 6,507,278 B1 | 1/2003 | Brunetti et al. |
| 6,546,072 B1 | 4/2003 | Chalmers |
| 6,552,346 B2 | 4/2003 | Verbinski et al. |
| 6,597,760 B2 | 7/2003 | Beneke et al. |
| 6,610,977 B2 | 8/2003 | Megerle |
| 6,665,373 B1 | 12/2003 | Kotowski et al. |
| 6,707,879 B2 | 3/2004 | McClelland et al. |
| 6,721,391 B2 | 4/2004 | McClelland et al. |
| 6,742,301 B1 | 6/2004 | Schwarz |
| 6,745,520 B2 | 6/2004 | Puskaric et al. |
| 6,819,109 B2 | 11/2004 | Sowers et al. |
| 6,819,241 B2 | 11/2004 | Turner et al. |
| 6,870,791 B1 | 3/2005 | Caulfield et al. |
| 6,899,540 B1 | 5/2005 | Neiderman et al. |
| 6,901,346 B2 | 5/2005 | Tracy et al. |
| 6,911,907 B2 | 6/2005 | Kelliher et al. |
| 6,965,340 B1 | 11/2005 | Baharav et al. |
| 6,967,612 B1 | 11/2005 | Gorman et al. |
| 6,967,674 B1 | 11/2005 | Lausch |
| 6,970,086 B2 | 11/2005 | Nelson |
| 6,970,087 B2 | 11/2005 | Stis |
| 7,053,785 B2 | 5/2006 | Akins |
| 7,092,485 B2 | 8/2006 | Kravis |
| 7,110,493 B1 | 9/2006 | Kotowski et al. |
| 7,110,925 B2 | 9/2006 | Pendergraft et al. |
| 7,185,206 B2 | 2/2007 | Goldstein |
| 7,257,189 B2 | 8/2007 | Modica et al. |
| 7,286,634 B2 | 10/2007 | Sommer, Jr. et al. |
| 7,418,077 B2 | 8/2008 | Gray |
| 7,505,557 B2 | 3/2009 | Modica et al. |
| 8,148,693 B2 * | 4/2012 | Ryge et al. ............... 250/361 R |
| 2002/0045152 A1 | 4/2002 | Viscardi et al. |
| 2003/0025302 A1 | 2/2003 | Urffer, III et al. |
| 2003/0171939 A1 | 9/2003 | Yagesh et al. |
| 2003/0214407 A1 | 11/2003 | Sweatte |
| 2003/0225612 A1 | 12/2003 | DeSimone et al. |
| 2003/0229506 A1 | 12/2003 | Scott et al. |
| 2004/0017888 A1 | 1/2004 | Seppi et al. |
| 2004/0051265 A1 | 3/2004 | Nadeau |
| 2004/0088584 A1 | 5/2004 | Shachar et al. |
| 2004/0120454 A1 | 6/2004 | Ellenbogen et al. |
| 2005/0024199 A1 | 2/2005 | Huey et al. |
| 2006/0262902 A1 | 11/2006 | Wattenburg |

* cited by examiner

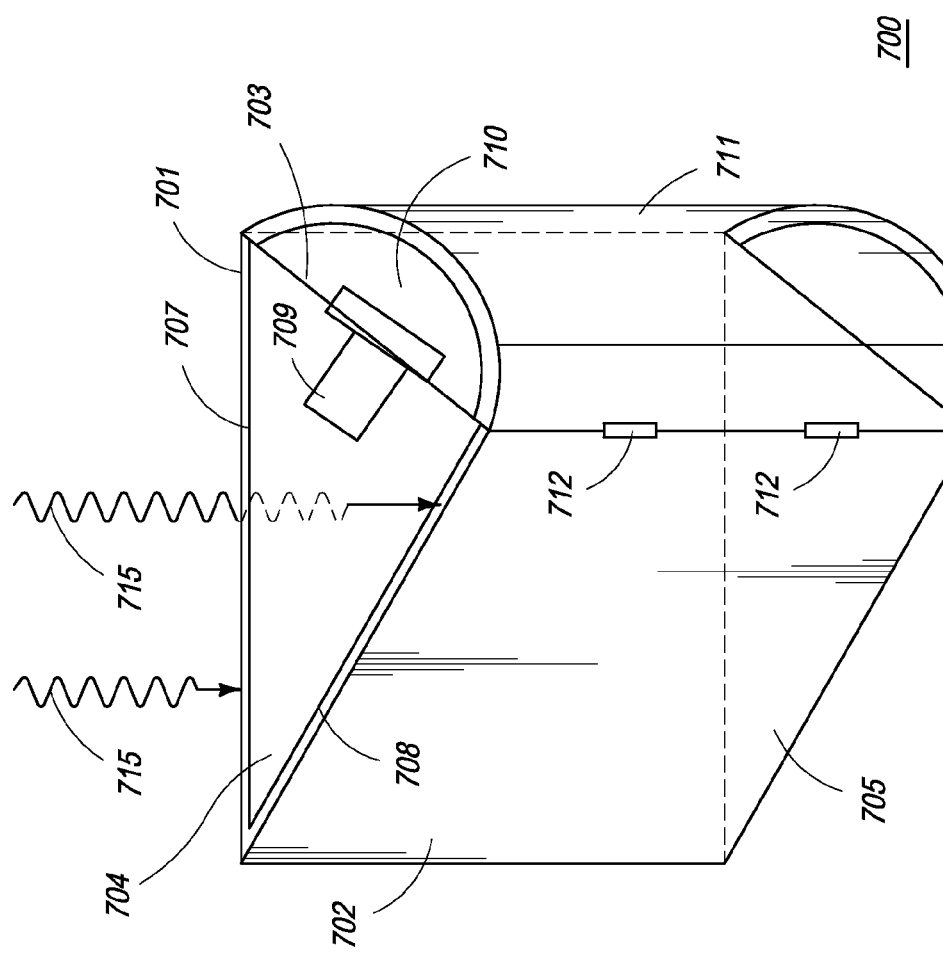

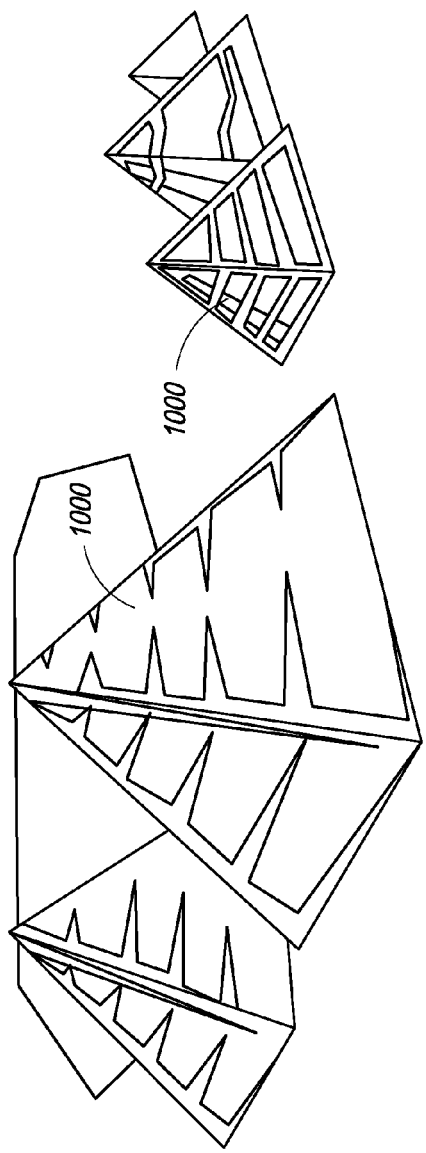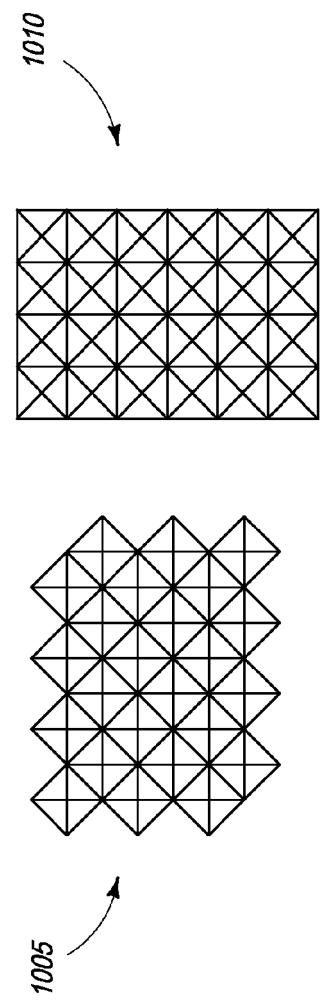
FIG. 10A
FIG. 10B

MULTIPLE SCREEN DETECTION SYSTEMS

CROSS-REFERENCE OF THE INVENTION

The present specification is a continuation of U.S. patent application Ser. No. 13/047,696, filed Mar. 14, 2011, Now U.S. Pat. No. 8,148,693, which relies on U.S. Provisional Application No. 61/313,773, filed on Mar. 14, 2010. U.S. patent application Ser. No. 13/047,696 is a continuation-in-part of U.S. patent application Ser. No. 12/262,631, which was filed on Oct. 31, 2008, now U.S. Pat. No. 8,003,949 and relies on U.S. Provisional Application No. 60/984,640, which was filed on Nov. 1, 2007 for priority. All of the aforementioned applications are herein incorporated by reference.

FIELD OF THE INVENTION

The present specification generally discloses radiant energy imaging systems. In particular, the present specification discloses detection systems and methods of using the detection systems in radiant energy imaging systems. And more particularly, the present specification discloses an improved detection system employing multiple screens for greater detection efficiency.

BACKGROUND OF THE INVENTION

Security systems are presently limited in their ability to detect contraband, weapons, explosives, and other dangerous objects concealed under clothing. Metal detectors and chemical sniffers are commonly used for the detection of large metal objects and some varieties of explosives, however, a wide range of dangerous objects exist that cannot be detected with these devices. Plastic and ceramic weapons developed by modern technology increase the types of non-metallic objects that security personnel are required to detect; the alternative of manual searching of subjects is slow, inconvenient, and is not well-tolerated by the general public, especially as a standard procedure in, for example, airports.

Further, radiation exposure is an important consideration in X-ray concealed object detection systems. Currently, the United States standard permits a radiation exposure of 0.25 microrem per inspection event. It should be noted that the inspection equipment is regulated in terms of the allowable limits of radiation exposure to a person per inspection event. Persons employed in high security or secured facilities, or those who frequently travel by airlines, may be subjected to many security examinations per year. The standard criterion thus assures that an individual inspected less than about 100 times per year will not receive a non-negligible radiation dose.

Conventional systems and methods for detecting objects concealed on persons have limitations in their design and method which prohibit them from achieving both low dose and high image quality which are prerequisites of commercial acceptance. Specifically, conventional prior art systems for people screening are designed such that they detect radiant energy that has been transmitted through the body, scattered from the body, and/or emitted from the body. In addition, in conventional people screening systems, images are produced by body characteristics and any object concealed under the subject's clothing. The system operator then inspects each image for evidence of concealed objects.

An example of such a system is described in U.S. Pat. No. RE 28544, assigned to American Science and Engineering, describes a "radiant energy imaging apparatus comprising: a source of a pencil beam of X-ray radiant energy; radiant energy detecting means defining a curve in fixed relationship to said source; means for scanning with said pencil beam said radiant energy detecting means along said curve to provide an image signal representative of the radiant energy response of the medium in a region traversed by said pencil beam along a path to said detecting means; means for relatively displacing said region and an assembly comprising said source and said detecting means to establish relative translating motion in a direction transverse to a line joining said source and said detecting means to produce a sequence of image signals representative of the radiant energy response of said region in two dimensions; and means responsive to said image signals for producing an image representative of said response."

U.S. Pat. No. 5,181,234, assigned to the assignee of the present invention, and herein incorporated by reference, discloses "X-ray imaging apparatus for detecting a low atomic number object carried by or on a human body positioned at a distance from said apparatus comprising: x-ray source for producing a pencil beam of X-rays directed toward said human body; scanning means for moving the region of intersection of said pencil beam and said human body over the surface of said human body in a scanning cycle, said scanning cycle being sufficiently short to expose said human body to a low radiation dose; a detector assembly providing a signal representative of the intensity of the X-rays scattered from said human body as a result of being scanned by said scanning means, said detector assembly being disposed on a same side of said human body as said X-ray source and having an active area with dimensions sufficient to receive a substantial portion of said scattered X-rays to provide a coefficient of variation of less than 10 percent in said signal; and display means to presenting characteristics of the detector signal to an operator; wherein said scattered X-rays are distributed across said detector to create an edge effect which enhances edges of said low atomic number object to enable detection."

In addition, prior art baggage inspection systems include detection means for both transmitted and backscattered X-rays to independently produce signals from the same incident beam. The separate signals may then be used to enhance each other to increase the system's accuracy in recognizing low Z materials. With the incident beam being of sufficient energy to provide both transmitted and backscattered signals, the X-ray energy must be relatively high, making such systems undesirable for personnel inspection. An example of such a system is U.S. Pat. No. 4,799,247, assigned to Annis et al., which discloses "a projection imaging system for inspecting objects for highlighting low Z materials comprising: a source of penetrating radiation, means for forming radiation emitted by said source into a beam of predetermined cross-section and for repeatedly sweeping said beam across a line in space, means for moving said object to be imaged relative to said source in a direction perpendicular to said line in space, first radiant energy detector means located to be responsive to radiant energy penetrating said object and emerging from said object, substantially unchanged in direction, for producing first electrical signals, second radiant energy detector means located further from said source than said object and responsive to radiant energy scattered by said object for producing second electrical signals, third radiant energy detector means located closer to said source than said object and responsive to radiant energy scattered by said object for producing third electrical signals, display means responsive to at least a pair of said electrical signals for separately, independently and simultaneously displaying said pair of electrical signals as a function of time".

As mentioned above, conventional systems and methods have limitations that prohibit them from achieving both low dose and high image quality which are prerequisites of commercial acceptance. In addition, in conventional people screening systems, images are produced by body characteristics and any object concealed under the subject's clothing.

The prior art systems are disadvantageous, however, because they do not adequately detect plastics, ceramics, explosives, illicit drugs, and other non-metallic objects. One reason in particular is that these materials share the property of a relatively low atomic number (low Z). Low Z materials present a special problem in personnel inspection because of the difficulty in distinguishing the low Z object from the background of the subject's body which also has low Z. An inspection system which operates at a low level of radiation exposure is limited in its precision by the small number of X-rays that can be directed against a person being searched. X-ray absorption and scattering further reduces the number of X-rays available to form an image of the person and any concealed objects. In prior art systems, this low number of detected X-rays has resulted in unacceptably poor image quality.

Therefore, what is needed is a method and apparatus that increases the efficiency of a detector to detect electromagnetic radiation and improve the quality of the resultant image generated, thus reducing the overall amount of radiation required.

What is also needed is a method for using an improved radiant energy imaging system with enhanced detection capabilities.

SUMMARY OF THE INVENTION

It is an object of the present invention to provide an apparatus and method for increasing the efficiency of a detector to detect electromagnetic radiation and improve the quality of the resultant image generated, thus reducing the overall amount of radiation required.

It is another object of the present invention to provide a detector configuration that maximizes the efficiency of the detector material. It is yet another object of the present invention to absorb more X-ray photons and thus, improve detection capability.

In one embodiment, the present invention is a detection system for detecting electromagnetic radiation comprising: an enclosure having four adjacent walls, connected to each other at an angle and forming a rectangle and interior portion of the enclosure; a front side area and a back side area formed from the four adjacent walls and located at each end of the enclosure; a plurality of screens, wherein each screen further comprises an active area for receiving and converting electromagnetic radiation into light; and a photodetector, positioned in the interior portion of the enclosure, having an active area responsive to the light.

In another embodiment, the present invention is a detection system for detecting electromagnetic radiation comprising: an enclosure having four adjacent walls, connected to each other at an angle and forming a rectangle and interior portion of the enclosure; a front side area and a back side area formed from the four adjacent walls and located at each end of the enclosure; a screen located in the front side area, further comprising an active area for receiving and converting electromagnetic radiation into light; at least one screen located in the interior portion of the enclosure; and a photodetector, positioned in the interior of the enclosure, having an active area responsive to the light.

In one embodiment, the front side area is formed from at least one of the plurality of screens. In another embodiment, the active area on each of the plurality of screens comprises a scintillator material, where the scintillator material is calcium tungstate. In one embodiment, the photodetector is a photomultiplier tube.

In one embodiment, the detection system enclosure is capable of receiving, but not leaking electromagnetic radiation. In another embodiment, the interior surface of the adjacent enclosing walls is light reflective.

In one embodiment, the active area of at least one of the plurality of screens is larger than the active area of the photodetector and the areal density is 80 mg/cm$^2$.

In one embodiment, the surface geometry of at least one of the plurality of screens is straight or smooth. In another embodiment, the surface geometry of at least one of the plurality of screens is irregular. In yet another embodiment, the surface geometry of at least one of the plurality of screens is contoured. In still another embodiment, the surface geometry of at least one of the plurality of screens is corrugated.

In one embodiment the surface geometry of the at least one screen is pyramidal. In another embodiment the surface geometry of the at least one screen is conical. In a yet another embodiment the surface of the at least one screen comprises a plurality of fish-scale like scintillating elements. In a still another embodiment the surface configuration of the at least one screen is in the form of hexagonal beehive like elements.

In another embodiment, the present invention is a radiant energy imaging system comprising: a radiation source; a detection system, comprising i) an enclosure having four adjacent walls, connected to each other at an angle and forming a rectangle and interior portion of the enclosure; ii) a front side area and a back side area formed from the four adjacent walls and located at each end of the enclosure; iii) a plurality of screens, wherein each screen further comprises an active area for receiving and converting electromagnetic radiation into light; and iv) a photodetector, positioned in the interior of the enclosure, having an active area responsive to the light; an image processor for receiving signals from the photodetector and generating an image; and a display for displaying the image generated. In one embodiment, the radiant energy imaging system is a people screening system. In another embodiment, the radiant energy imaging system is a baggage screening system.

In a yet another embodiment, the present invention is a dual screen detection system for detecting electromagnetic radiation comprising: an enclosure having three adjacent side walls forming a front side area, a second side area and a third side area. The three adjacent side walls are connected to each other at an angle and form an enclosure having a triangular cross-section. The three adjacent side walls are also connected to a top and bottom areas. The front side area faces the object or subject under inspection and comprises a first screen. The second side area further comprises a second screen located in the interior of the enclosure. A photomultiplier tube is placed proximate to the third side area. The back-end electronics and cables associated with the photomultiplier tube are enclosed in a housing that is formed by the third side area and a substantially semi-circular side.

In one embodiment the aforementioned detector enclosures are deployed in the form of modular tear-drop panels, cabinets or towers providing a contemporary and aesthetic look. In one embodiment, the present invention is a radiant energy imaging system in the form of a single-sided walk-by secure stand-off for screening human subjects comprising: two dual screen detector enclosures embodied in the form of modular cabinets, towers or panels. Another modular housing encloses a radiation source. The two dual screen detector towers are placed symmetrically on both sides of an opening in the radiation source housing. The opening allows a narrow pencil beam of X-rays to impinge upon a subject. The backscattered X-ray photons are captured by the two detector towers for imaging.

According to an object of the present invention, the walk-by stand-off people screening system has modular components that can be disassembled for mobility and easy transportation and reassembled again at the site of interest. Thus, the tear drop detector towers and the radiation source housing with associated electronics and cables are manufactured as separate modules or cabinets that can be integrated quickly to form the screening system.

In one embodiment, the present invention is a detection system for detecting electromagnetic radiation comprising: an enclosure having two adjacent walls, each having interior surfaces, a first end and a second end, wherein the first ends of the two adjacent walls are connected at an angle to form an interior and wherein the second ends of the two adjacent walls are connected to a semi-circular housing; at least one substrate, positioned on each of said interior surfaces of the adjacent walls, wherein each substrate further comprises an active area for receiving and converting electromagnetic radiation into light; and a photodetector, positioned in the interior portion of the semi-circular housing, wherein said photodetector has an active area responsive to the light. The two adjacent walls enclose a volume having a form of a triangular prism. The interior surfaces of the adjacent walls are light reflective. The active area on each of the substrates comprises a scintillator material. The scintillator material is calcium tungstate.

The active area of at least one of the substrates is larger than the active area of the photodetector. The surface geometry of at least one of the substrates is at least one of smooth, pyramidal, hexagonal, conical, fan-shaped, irregular, contoured, or corrugated. The photodetector is a photomultiplier tube.

In another embodiment, the present invention is a detection system for detecting electromagnetic radiation comprising: a first enclosure having two adjacent walls, each having interior surfaces, a first end and a second end, wherein the first ends of the two adjacent walls are connected at an angle to form an interior and wherein the second ends of the two adjacent walls are connected to a semi-circular housing; at least one substrate, positioned on each of said interior surfaces of the adjacent walls, wherein each substrate further comprises an active area for receiving and converting electromagnetic radiation into light; and a photodetector, positioned in the interior portion of the semi-circular housing, wherein said photodetector has an active area responsive to the light; and a second enclosure having two adjacent walls, each having interior surfaces, a first end and a second end, wherein the first ends of the two adjacent walls are connected at an angle to form an interior and wherein the second ends of the two adjacent walls are connected to a semi-circular housing; at least one substrate, positioned on each of said interior surfaces of the adjacent walls, wherein each substrate further comprises an active area for receiving and converting electromagnetic radiation into light; and a photodetector, positioned in the interior portion of the semi-circular housing, wherein said photodetector has an active area responsive to the light.

The first enclosure and said second enclosure are positioned next to each other and separated by an elongated member. The elongated member comprises a slit configured to pass X-ray radiation. The two adjacent walls in said first enclosure enclose a volume having a form of a triangular prism. The interior surfaces of the adjacent walls in said second enclosure are light reflective. The active area on each of the substrates in said first enclosure and second enclosure comprises a scintillator material. The scintillator material is calcium tungstate. The active area of at least one of the substrates in said first enclosure and said second enclosure is larger than the active area of the photodetector. The surface geometry of at least one of the substrates in said first enclosure and said second enclosure is at least one of smooth, pyramidal, hexagonal, conical, fan-shaped, irregular, contoured, or corrugated. The photodetector in the first enclosure is a photomultiplier tube.

In another embodiment, the present specification discloses a detector system comprising: an enclosed interior volume defined by a) a first side having a first end and a second end; b) a second side having a first end and a second end, wherein the first end of the first side is attached to the first end of the second side and forms an acute angle with respect thereto; c) a curved section having a first end and a second end, wherein the first end of the curved section is attached to the second end of the second side and wherein the second end of the curved section is attached to the second end of the first side, d) a first substrate positioned on an interior surface of the first side, wherein the first substrate further comprises an active area for receiving and converting radiation into light; e) a second substrate positioned on an interior surface of the second side, wherein the second substrate further comprises an active area for receiving and converting radiation into light; and f) at least one photodetector.

Optionally, the photodetector comprises a light responsive area and a non-light responsive area and wherein the light responsive area is positioned to receive the light emitted from the first substrate and the second substrate. The non-light responsive area is positioned within the curved section. The attachment of the first end of the curved section to the second end of the second side or the attachment of the second end of the curved section to the second end of the first side is hinged. The curved section is adapted to be rotated relative to said hinge. The photodetector comprises a light responsive area and a non-light responsive area and wherein the light responsive area is positioned to receive the light emitted from the first substrate and the emitted from the second substrate. Upon the curved section being rotated relative to said hinge, said non-light responsive area is accessible from outside the enclosed interior volume.

In another embodiment, the present specification discloses a detector system comprising: a) a first side defined by a planar surface having an exterior surface facing a subject under inspection and an interior surface, wherein the first side is configured to receive radiation backscattered from said subject; b) a second side in an acute angular relationship with said first side, wherein said second side is defined by a planar surface having an interior surface adapted to receive radiation passing through the first side and wherein said second side is configured to only receive radiation after it passes through said first side; c) a first substrate positioned on the interior surface of the first side, wherein the first substrate further comprises an active area for receiving and converting said radiation into light; d) a second substrate positioned on the interior surface of the second side, wherein the second substrate further comprises an active area for receiving and converting said radiation into light; and e) at least one photodetector having a light responsive area and a non-light responsive area, wherein the light responsive area is positioned to receive the light emitted from the first substrate and the second substrate.

Optionally, the radiation comprises X-ray photons. The first substrate detects 30-60% of the X-ray photons impinging on said first side. The second substrate detects 10-30% of the X-ray photons impinging on said first side.

BRIEF DESCRIPTION OF THE DRAWINGS

These and other features and advantages of the present invention will be appreciated, as they become better understood by reference to the following detailed description when considered in connection with the accompanying drawings, wherein:

FIG. 7 illustrates one embodiment of the detector enclosure of the present invention, comprising at least two screens;

FIG. 10a shows embodiments where the surface geometry of the at least one screen is pyramidal;

FIG. 10b shows screen surface configurations for pyramidal surface geometry;

DETAILED DESCRIPTION OF THE INVENTION

Figure 1:
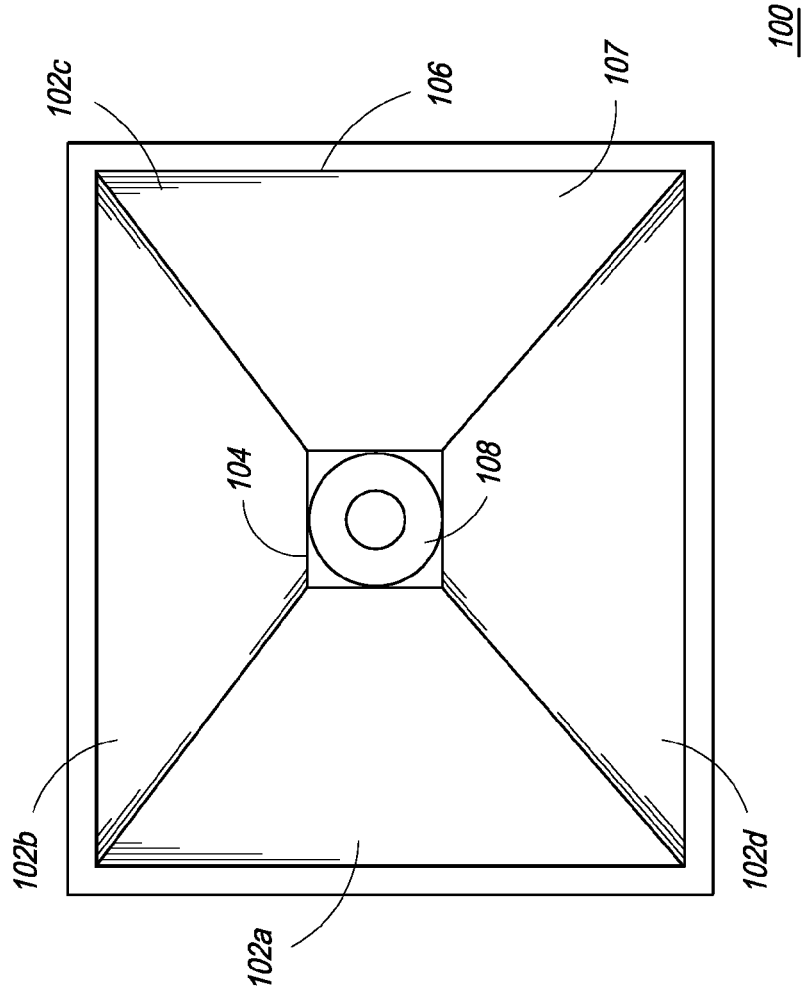
FIG. 1 is a front view illustration of a conventional detector enclosure, having one screen.

The present invention is directed towards several embodiments of an electromagnetic radiation detector in which a plurality of screens is employed. The present invention is directed towards a detection system enclosure having at least one screen. Electromagnetic radiation is absorbed by the screen which emits light photons that are detected by a photomultiplier tube located within the enclosure. In one embodiment, the detection system of the present invention has one screen located at the front of the enclosure and at least one screen located in the interior of the enclosure. In one embodiment, the at least one screen comprises an active area for receiving and converting electromagnetic radiation into light (photons). In one embodiment, the active area of the at least one screen comprises a scintillator material. In one embodiment, the scintillator material is calcium tungstate.

In one embodiment, the at least one screen has a thickness (areal density) of 80 mg/cm². In one embodiment, the surface geometry of the at least one screen is straight or smooth. In one embodiment, the surface geometry of the at least one screen is irregular. In another embodiment, the surface geometry of the at least one screen is contoured. In another embodiment, the surface geometry of the at least one screen is corrugated; a corrugated surface geometry provides a greater surface area for receiving and converting electromagnetic radiation into light, by allowing for an increase in the electromagnetic radiation path length without increasing the light output path length, for maximum detection efficiency. It should be understood by those of ordinary skill in the art that any surface geometry may be used for the screen to increase the amount of electromagnetic radiation absorbed.

The present invention is also directed towards the use of at least one screen in the interior of the enclosure, thus increasing the amount of electromagnetic radiation reaching the detector, and subsequently, the amount of photons reaching the photomultiplier. In one embodiment, the at least one screen located in the interior of the enclosure has substantially identical specifications to the screen located in the front of the enclosure. In one embodiment, the at least one screen positioned in the interior of the enclosure is different from the screen located in the front of the enclosure, in terms of at least one of chemical composition, surface geometry, thickness and energy response. The use of a screen at the front of the enclosure and the at least one screen in the interior of the enclosure increases the amount of electromagnetic radiation absorbed and therefore, the number of photons generated, further improving detection capability, and thus image quality.

Thus, the present invention is directed towards a detector configuration that maximizes the efficiency of the detector material. Detection efficiency is a measure of the efficiency of the detector screen, or, the probability that electromagnetic radiation will be absorbed by the screen to produce light photons detectable by the photomultiplier tube. X-ray detectors need to interact with incident X-ray photons to record their presence; X-rays that pass through the detector without interaction are wasted. Detection efficiency is mainly determined by the interaction probability of the photons with the detector material and the thickness of the material. The following equation can be used to calculate the efficiency of a detector:

$$I = I_0 * e^{-\mu x}$$

where $I_0$ is the number of photons of a certain energy incident or entering the slab of material; x is the thickness of the slab, I is the number of photons that have passed through a layer of thickness x, and $\mu$ is the linear attenuation coefficient of the material for photons of this particular energy.

The photons that do not get through have interacted within the slab of material and are either absorbed or scattered. The number of photons absorbed by a certain thickness is the difference I0−I. However, instead of calculating for different I's, the ratio of (I0−I)/I is calculated and it is called the "Percent Absorption." Conventional screens typically achieve far less than 100% efficiency. The present invention is directed toward absorbing more of the otherwise wasted X-ray photons and thereby improving the detection capability.

In another embodiment, the present invention is also directed towards a detection system enclosure that further comprises a photo-multiplier tube, positioned in the interior of the enclosure, having an active area responsive to the light. In another embodiment, the active area of the at least one screen is larger than the active area of the photo-multiplier tube so that the amount of electromagnetic radiation absorbed is maximized.

The present invention is directed towards multiple embodiments. Language used in this specification should not be interpreted as a general disavowal of any one specific embodiment or used to limit the claims beyond the meaning of the terms used therein. Reference will now be made in detail to specific embodiments of the invention. While the invention will be described in conjunction with specific embodiments, it is not intended to limit the invention to one embodiment.

FIG. 1 is a front view illustration of a conventional detector enclosure, having one screen. In one embodiment, detector 100 comprises an enclosure having four adjacent walls, 102a, 102b, 102c, and 102d, connected to each other at an angle. In one embodiment, the four adjacent walls 102a, 102b, 102c, and 102d form a rectangular shape. In one embodiment, the rectangular shape is a trapezium-like shape. Adjacent walls 102a, 102b, 102c, and 102d further form a front side area 106 and a back side area 104 at the ends of the enclosure.

In one embodiment, the enclosure formed from adjacent walls 102a, 102b, 102c, 102d, front side area 106 and back side area 104 is capable of receiving, but not leaking electromagnetic radiation, thereby blocking the exit of incoming radiation from a radiation source. In one embodiment, the ability of the enclosure to receive, and not leak, radiation, is facilitated by the light reflective interiors of the enclosing walls. In one embodiment, the interiors of walls 102a, 102b, 102c, and 102d are painted white so that they are highly light reflective.

In one embodiment, front side area 106 of detector enclosure 100 is used for receiving radiation and thus faces the object under inspection when in use in an exemplary scanning system, as described in detail with respect to FIGS. 5 and 6 below. In one embodiment, front side area 106 further comprises screen 107.

In addition, detector enclosure 100 further comprises photo-detector 108, placed in the interior of the enclosure proximate to back side area 104. In one embodiment, the photo-detector 108 is a photomultiplier tube. Photomultiplier tubes are well-known to those of ordinary skill in the art and will not be discussed herein.

Figure 2A:
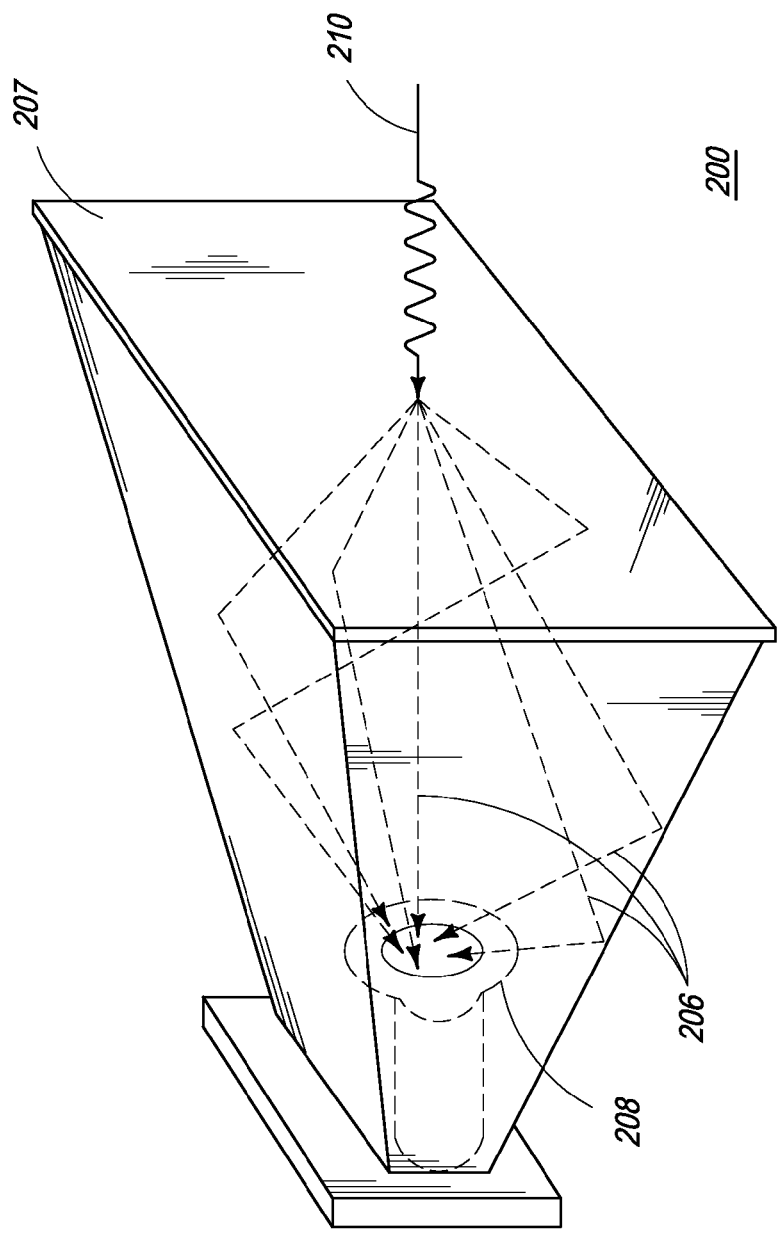
FIGS. 2a and 2b illustrate the incidence of electromagnetic radiation on a first screen of a conventional detector enclosure.
Figure 2B:
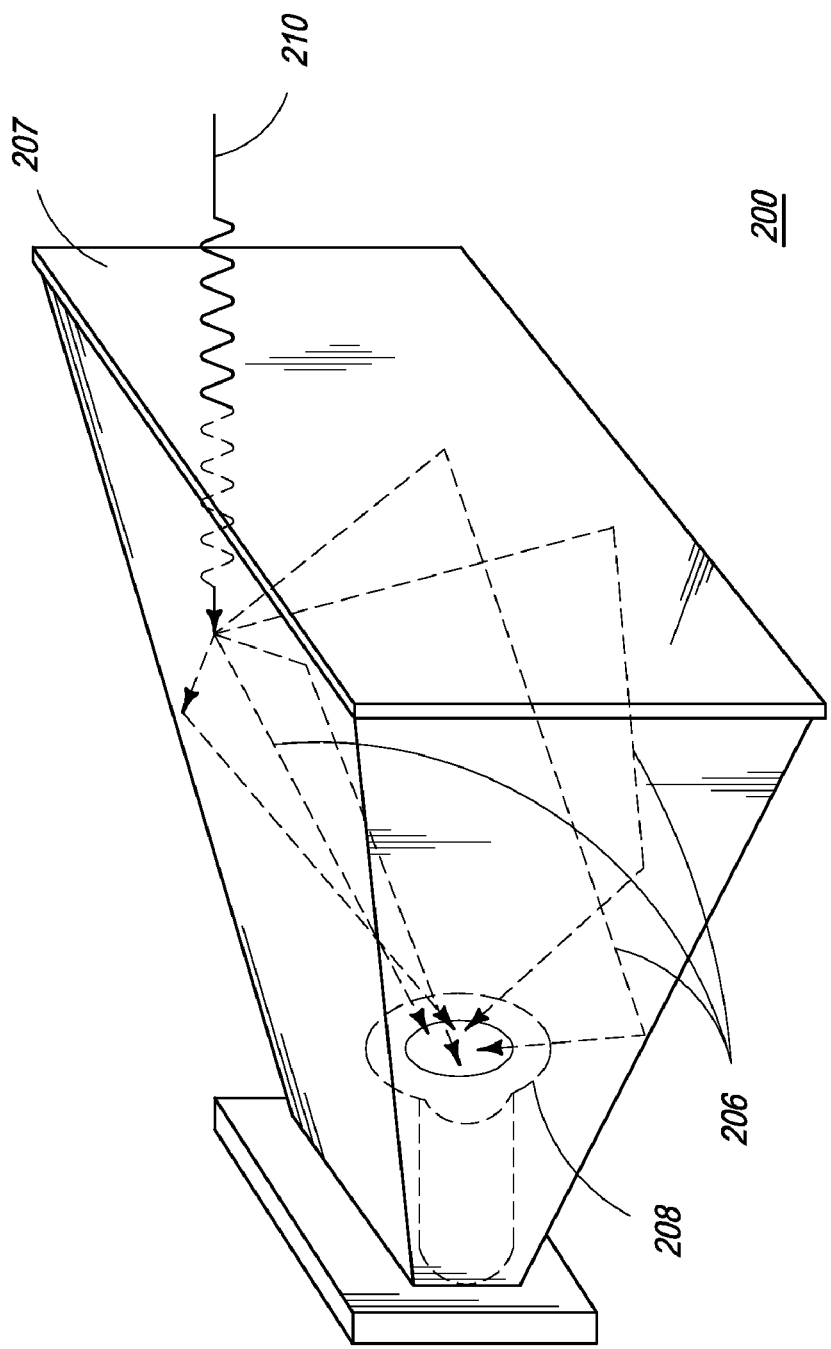

FIGS. 2a and 2b illustrate the incidence of electromagnetic radiation on a first screen of a conventional detector enclosure. In operation, the screening system directs electromagnetic radiation from a source toward a subject or object under inspection such that the X-rays are incident upon the subject or object. The X-rays are then, depending upon the intensity of the X-ray and the type of inspection system being employed, scattered from or transmitted through the subject or object under inspection. The radiation source and the nature of the X-ray beam are described in detail with respect to FIGS. 5 and 6 below and will not be discussed herein.

Now referring to FIG. 2a scattered or transmitted X-rays 210 reach the detector enclosure 200 and first impinge upon screen 207. Screen 207 absorbs at least a portion of the scattered or transmitted X-rays 210 and converts the X-rays into light photons 206 in the interior of detector enclosure 200.

As shown in FIG. 2b, however, some of the X-rays are not absorbed and thus pass through screen 207. In addition, in a conventional detector enclosure with only one front screen, at least a portion of photons 206 reflect off of the highly reflective interior walls of the enclosure and are subsequently detected by photomultiplier tube 208.

In one embodiment, as described in greater detail with respect to FIG. 3 below, the present invention is a detector enclosure comprising at least one additional screen (not shown in FIGS. 2a and 2b) in the interior of the enclosure. The at least one additional screen further increases the exposure rate of the scattered or transmitted X-rays 210. The net effect of the at least one additional screen is to increase the photo-detection efficiency of photomultiplier tube 208 by absorbing more electromagnetic radiation, subsequently converting that radiation to light, and thus, providing the photomultiplier tube with a stronger signal to detect.

Figure 3:
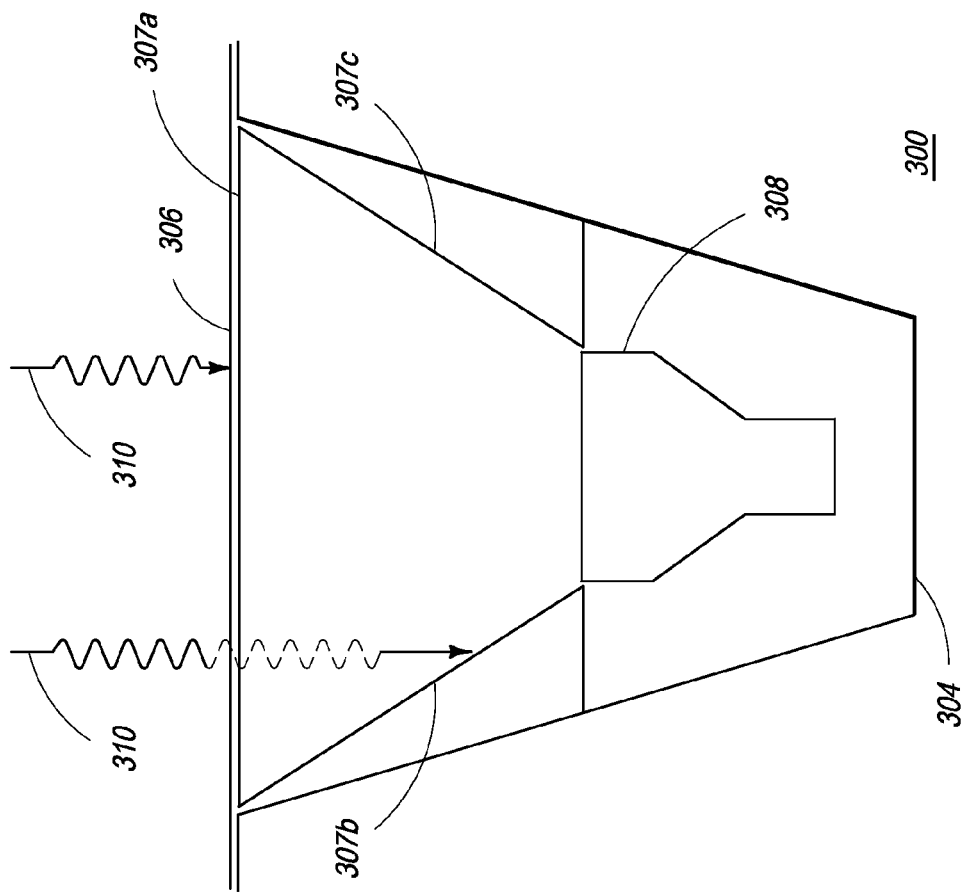
FIG. 3 illustrates one embodiment of the detector enclosure of the present invention, having a plurality of screens, showing the incidence of electromagnetic radiation on the plurality of screens.

FIG. 3 illustrates one embodiment of the detector of the present invention, having a plurality of screens. Detector enclosure 300 is similar to the enclosure described with respect to FIG. 1, in that it comprises four adjacent side walls (not fully shown in FIG. 3) which form a front side area 306 and a back side area 304. The enclosure will not be described in further detail herein. One of ordinary skill in the art should appreciate that the present invention can be used with the detector enclosure of FIG. 1 or modified so as not to depart from the invention described herein.

Referring now to FIG. 3, first screen 307a is located on the front side area 306 of detector enclosure 300. In one embodiment, second and third screens 307b and 307c are positioned inside the detector enclosure 300. The X-rays scattered from or transmitted through the subject or object under inspection 310 first impinge upon first screen 307a of detector enclosure 300. Some of the scattered or transmitted X-rays, however, are not absorbed by first screen 307a and thus pass through first screen 307a.

To increase detection efficiency, in one embodiment, detector enclosure 300 further comprises second and third screens, 307b and 307c, respectively in the interior of the enclosure. Second and third screens, 307b and 307c, respectively, further increase the exposure rate and thus, absorption of the scattered or transmitted X-rays 310. The overall effect of the first, second, and third screens is an increase in the photo-detection efficiency of photomultiplier tube 308 by absorbing more electromagnetic radiation, subsequently converting that radiation to light, and thus, providing the photomultiplier tube with a stronger signal to detect.

In one embodiment, first screen 307a comprises an active area for receiving and converting electromagnetic radiation into light (photons). In one embodiment, first screen 307a is a fluorescent chemical screen. In one embodiment, scintillators in the fluorescent chemical screen 307a detect a large fraction of the incident radiation, produce significant light output to the photomultiplier tube, and exhibit a temporal decay time which is short compared to the pixel to pixel scanning rate of the radiation beam.

In one embodiment, the fluorescent chemical screen includes calcium tungstate. Generally, a calcium tungstate screen has a relatively short decay time of 10 microseconds that allows rapid scanning of the radiation beam with minimal image degradation. The calcium tungstate screen is capable of detecting approximately 70% of the backscattered or transmitted radiation, and thus, produces approximately 250 usable light photons per 30 KeV X-ray.

Additionally, the use of a thicker screen enables the detection of more of the radiation incident upon the detector at the expense of lower light output. In one embodiment, the areal density of the screen is 80 milligrams per square centimeter.

In one embodiment, the at least one screen located in the interior of the enclosure has identical specifications to the screen located in the front of the enclosure. Thus, in one embodiment, second and third screens 307b and 307c, respectively, are identical to first screen 307a. In one embodiment, the at least one screen positioned in the interior of the enclosure is different from the screen located in the front of the enclosure, in terms of at least one of chemical composition, surface geometry, thickness and energy response. Thus, in one embodiment, second and third screens 307b and 307c, respectively, are different from first screen 307a.

Although exemplary screens have been described above, it should be noted that the characteristics of the screen can vary widely in terms of chemical composition, surface geometry, thickness and energy response, and that any type of screen may be used in the present invention, as would be evident to those of ordinary skill in the art.

Figure 4:
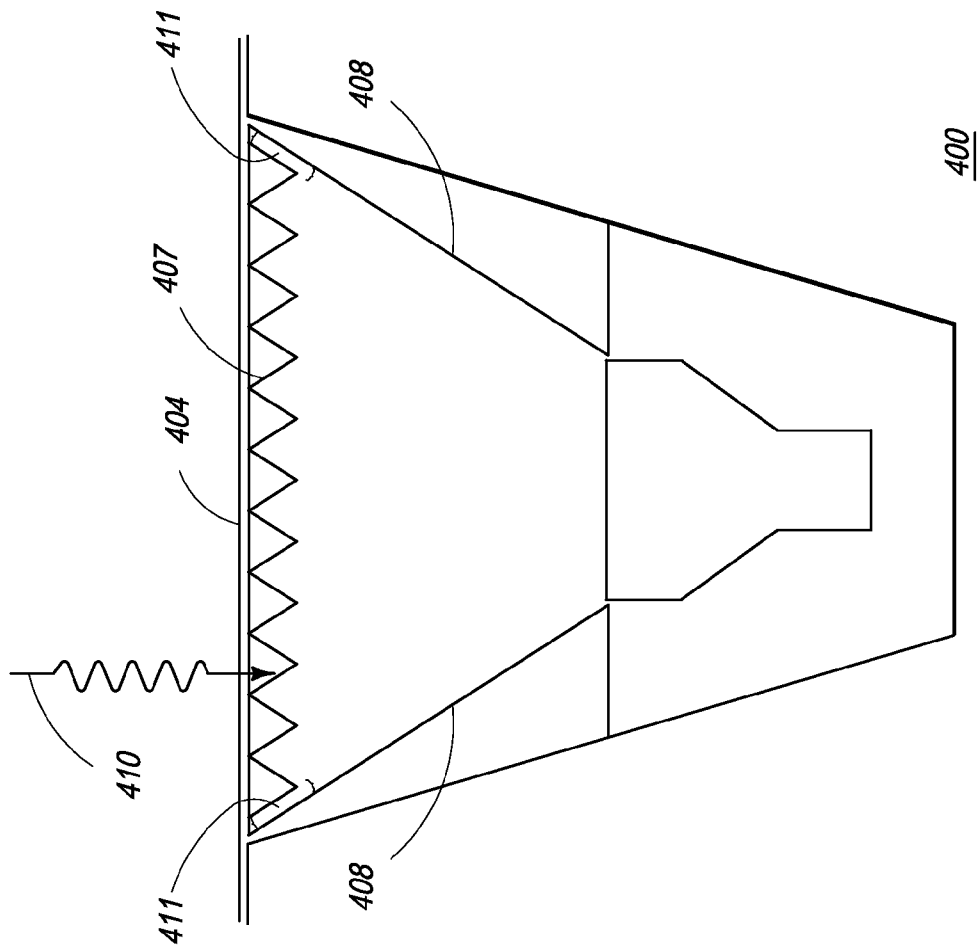
FIG. 4 illustrates another embodiment of the detector enclosure of the present invention, having a plurality of screens, showing the incidence of electromagnetic radiation on the plurality of screens.
Figure 12:
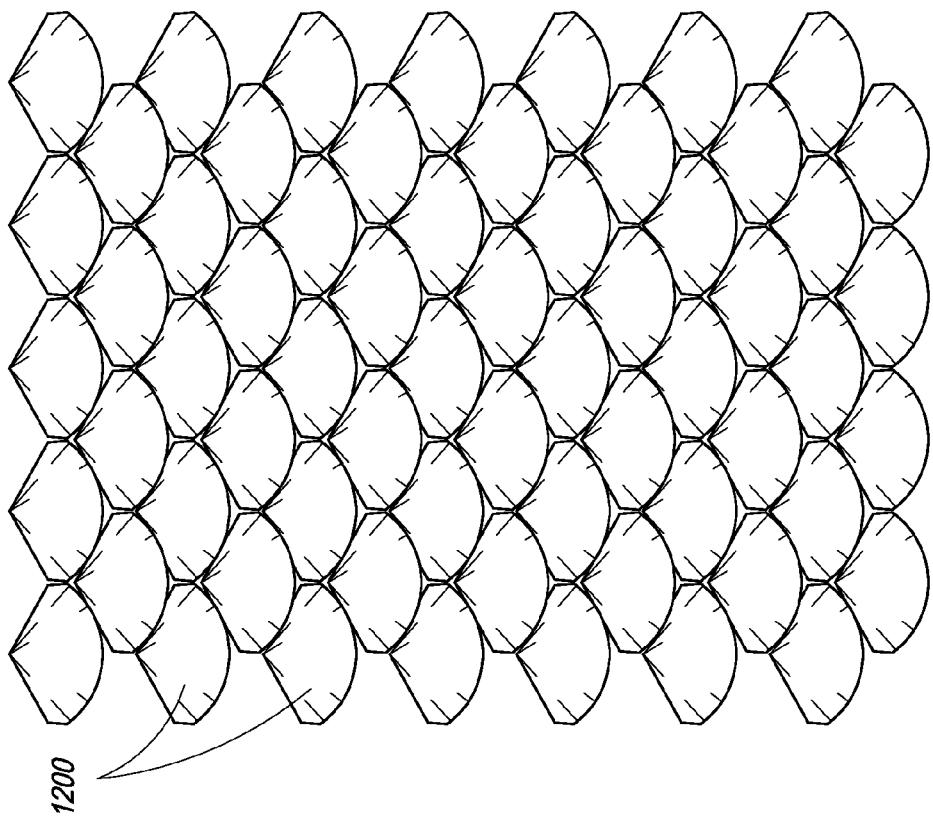
FIG. 12 shows an embodiment where the surface geometry of the at least one screen comprises fish-scale like scintillating elements.
Figure 11:
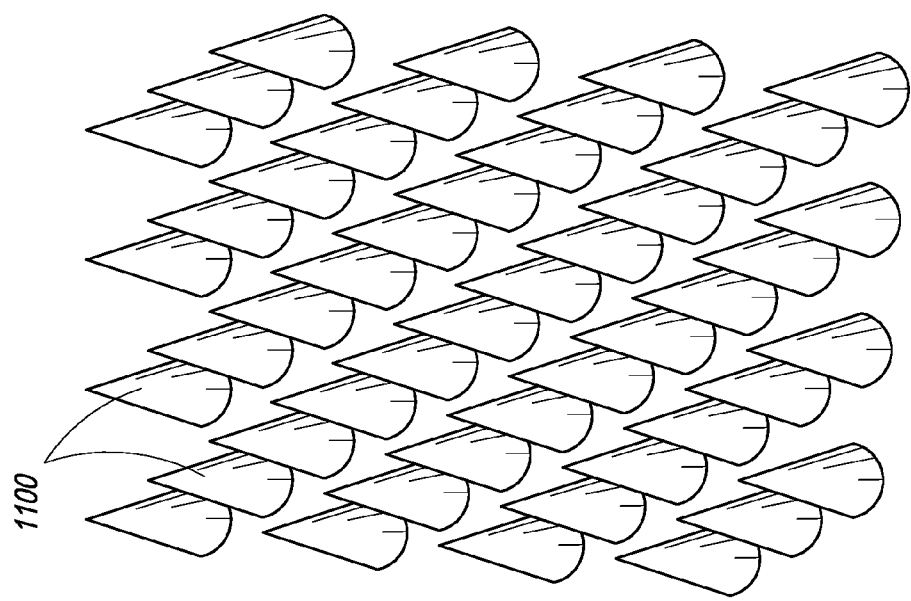
FIG. 11 shows an embodiment where the surface geometry of the at least one screen comprises conical scintillating elements.
Figure 13B:
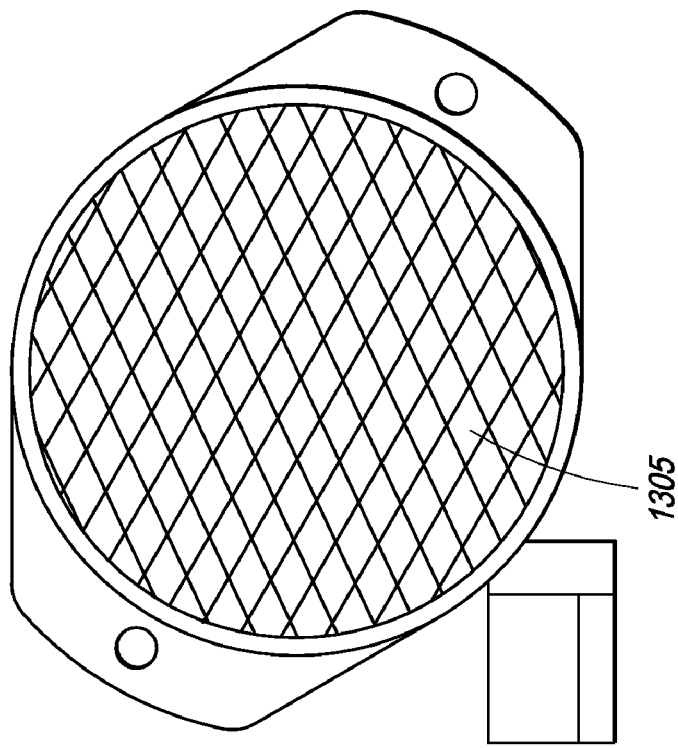
FIG. 13 shows an embodiment where the surface configuration of the at least one screen is in the form of hexagonal or beehive like elements.
Figure 13A:
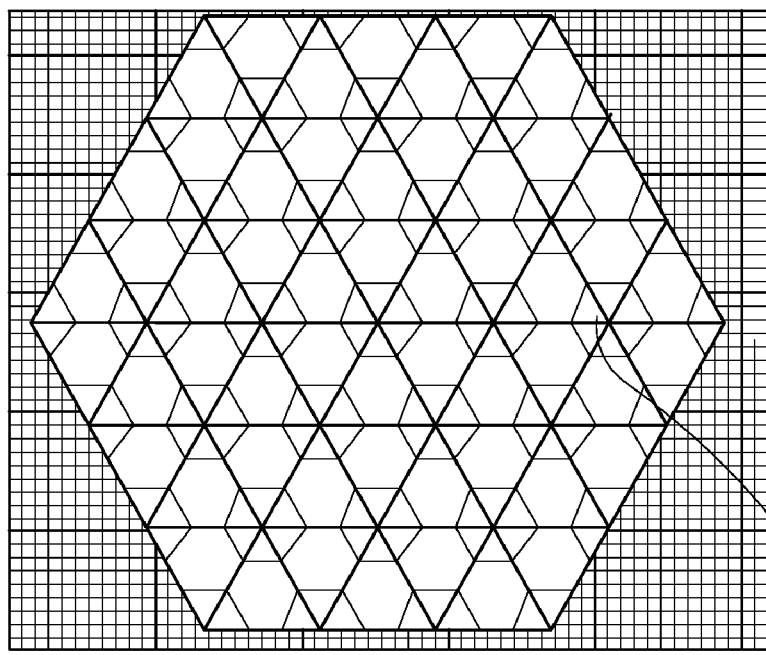

FIG. 4 illustrates another embodiment of the detector enclosure of the present invention, having a plurality of screens. In one embodiment, the surface geometry of the at least one screen is straight or smooth. In one embodiment, the surface geometry of the at least one screen is irregular. In another embodiment, the surface geometry of the at least one screen is contoured. In another embodiment, the surface geometry of the at least one screen is corrugated. A corrugated surface geometry provides a greater surface area for receiving and converting electromagnetic radiation into light, by allowing for an increase in the electromagnetic radiation path length without increasing the light output path length, for maximum detection efficiency. FIG. 10a shows embodiments where the surface geometry of the at least one screen is pyramidal 1000. FIG. 10b shows exemplary screen surface configurations 1005 and 1010 for pyramidal surface geometry. FIG. 11 shows another embodiment, where the surface geometry of the at least one screen comprises conical scintillating elements 1100. FIG. 12 shows yet another embodiment, where the surface geometry of the at least one screen comprises fan-shaped or fish-scale like scintillating elements 1200. FIG. 13 shows a still another embodiment where the surface configuration of the at least one screen is in the form of hexagonal or beehive like elements 1300 that is formed by deposition process of scintillation material on screen mould 1305. It should be understood by those of ordinary skill in the art that any surface type may be used for the screen to increase the amount of electromagnetic radiation absorbed.

In one embodiment, screen 407 located on front side area 404 of detector enclosure 400 is corrugated. The corrugated surface of screen 404 provides a greater surface area for absorbing scattered or transmitted electromagnetic radiation 410, incident upon the detector enclosure 400. It should be noted that because light generated in spaces 411, defined by screens 407 and 408, cannot escape easily, the detection efficiency, or effective detection area is reduced.

Figure 5:
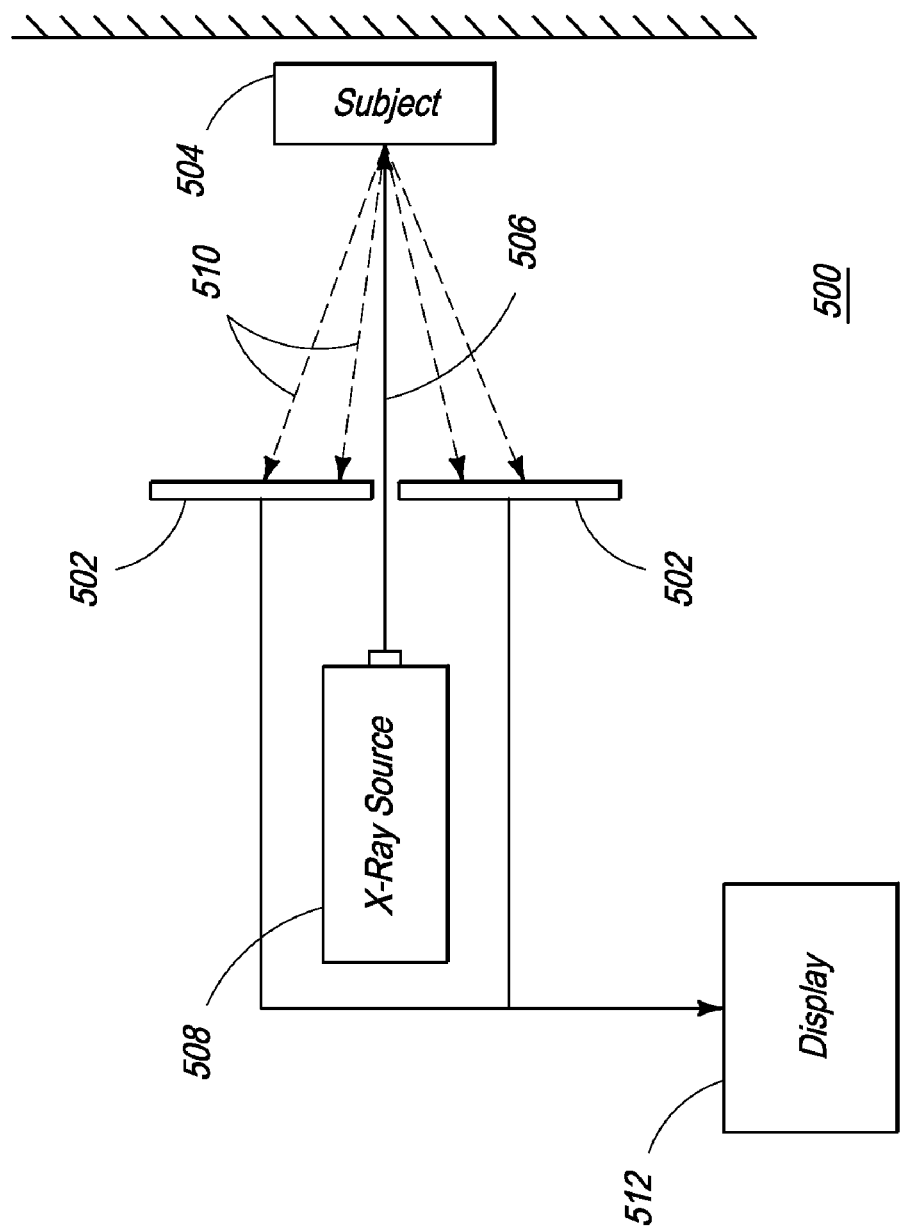
FIG. 5 illustrates one embodiment of a backscatter inspection system in which any of the detector enclosures of the present invention can be implemented.

FIG. 5 illustrates one embodiment of a scanning system in which any of the detector enclosures of the present invention can be implemented. In one embodiment, the detector enclosure of the present invention is employed in a backscatter X-ray scanning system, such as but not limited to a people screening system. In one embodiment, inspection system 500 comprises radiation source 508 and at least one detector enclosure 502. As described in detail above, the at least one detector enclosure 502 may comprise any number of arrangements including, but, not limited to at least one detector screen. In addition, at least one detector enclosure 502, in another embodiment, may comprise any number of arrangements including, but, not limited to a plurality of detector screens. While various arrangements of detectors will not be repeated herein, it should be understood by those of ordinary skill in the art that any number of detector arrangements can be employed, as described above and the exemplary embodiment is not intended to limit the present invention.

Referring back to FIG. 5, X-ray source 508 is used to generate radiation. In one embodiment, X-ray source 508 is employed to generate a narrow pencil beam 506 of X-rays directed towards an object or subject under examination 504. In one embodiment, pencil beam is formed with the integration of an x-ray tube, a mechanical chopper wheel, and a slit. In one embodiment, X-ray source 508 operates with an empirically and theoretically determined optimum X-ray tube potential of 50 KeV and 5 milliamps, resulting in X-rays of approximately 30 KeV. The vertical and horizontal dimension of the X-ray beam is approximately six millimeters (6 mm) where it strikes subject 504. Subject 504 is a body that is being subjected to X-ray imaging. In one embodiment, subject 504 is a human. In another embodiment, subject 504 is an object. Initially, X-ray beam 506 strikes only the body of subject 504. Many of the X-rays penetrate a few centimeters into the body, interact by Compton scattering, and exit the body through the same surface that they entered. X-ray sensitive detector enclosures 502 are placed symmetrically around incident X-ray pencil beam to detect backscattered X-rays 510 and provide an electronic signal characteristic of the X-ray reflectance. It should be understood to those of ordinary skill in the art that any number of ionizing radiation sources may be used, including but not limited to gamma radiation, electromagnetic radiation, and ultraviolet radiation.

Detectors 502 are positioned for uniform X-ray detection on all sides of X-ray beam 506. In one embodiment, arrays of detectors 502 are placed around source 508 for uniform detection of backscattered rays 510. Detectors 502 include an enclosure capable of enclosing or "trapping" scattered rays 510. A photo-detector generates electronic signals in response to detected rays that are initially converted into light. Details about the structure and operation of several embodiments of a detector 502 are discussed in detail with respect to FIGS. 1-4 and will not be repeated herein.

In one embodiment, each detector 502 produces electronic signals which are directed to a processor. The processor analyzes the received signals and generates an image on a display means 512. The intensity at each point in the displayed image corresponds to the relative intensity of the detected scattered X-rays. In one embodiment, X-ray source 508 communicates synchronization signals to the processor. The processor analyzes the detected signals and compares them to the synchronization signals to determine the display image.

In one embodiment, display means 512 is a monitor and is employed to display graphical images signaled by the processor. Display means 512 can be any display or monitor as commonly known in the art, including a cathode ray tube monitor or an LCD monitor. In one embodiment, the digitized scatter image displayed by display means 512 preferably consists of 480 rows by 160 columns with 8 bits per pixel.

Referring back to FIG. 5, detectors 502 are separated by an opening through which X-ray beam 506 passes before striking subject 504. In one embodiment, detectors 502 can move in a vertical direction while X-ray beam 506 moves in a horizontal direction by movement of X-ray source 508 in the horizontal direction. However, the placement and movement of detectors 502 and source 508 is not limited to the description provided herein. In other embodiments, detectors 502 and source 508 can be placed and moved by any method as is commonly known in the art. The intersection of X-ray beam 506 and subject 504 defines an image picture element (pixel) of a specified area.

Figure 6:
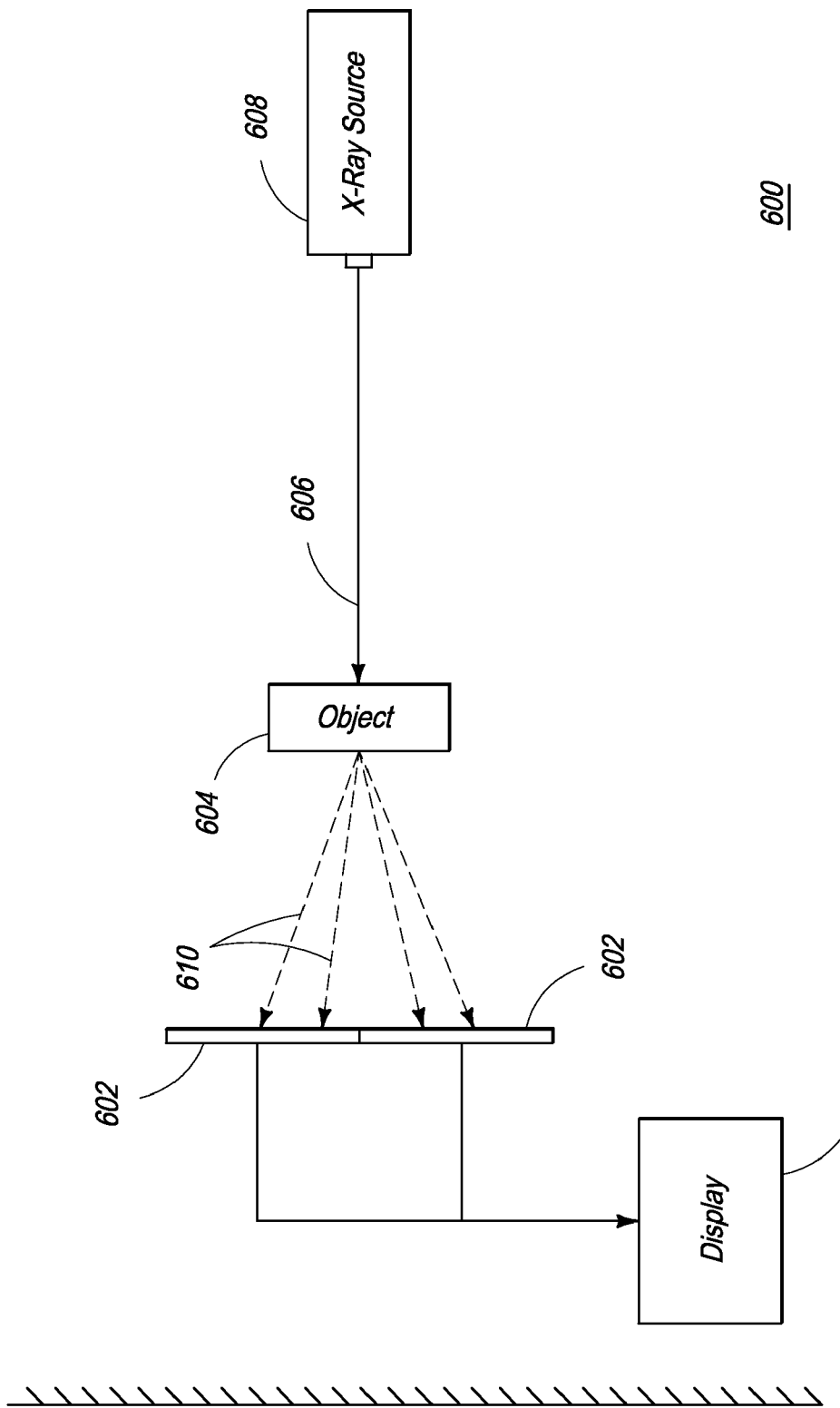
FIG. 6 illustrates one embodiment of a traditional transmission X-ray screening system in which any of the detector enclosures of the present invention can be implemented.

FIG. 6 illustrates another embodiment of a scanning system in which any of the detector enclosures of the present invention can be implemented. In another embodiment, the scanning system is a traditional X-ray scanning system, in which X-rays are transmitted through the object under inspection. In one embodiment, the traditional transmission X-ray scanning system is a baggage scanning system.

In one embodiment, inspection system 600 comprises radiation source 608 and at least one detector enclosure 602. As described in detail above, the at least one detector enclosure 602 may comprise any number of arrangements including, but, not limited to at least one detector screen. In addition, at least one detector enclosure 602, in another embodiment, may comprise any number of arrangements including, but, not limited to a plurality of detector screens. While various arrangements of detectors will not be repeated herein, it should be understood by those of ordinary skill in the art that any number of detector arrangements can be employed, as described above and the exemplary embodiment is not intended to limit the present invention.

Referring back to FIG. 6, X-ray source 608 is used to generate radiation. In one embodiment, X-ray source 608 is employed to generate a narrow pencil beam 606 of X-rays directed towards an object or subject under examination 604. In one embodiment, pencil beam is formed with the integration of an x-ray tube, a mechanical chopper wheel, and a slit.

Object 604 is an item that is subjected to X-ray imaging. In one embodiment, object 604 is a piece of luggage or carry-on baggage. Initially, X-ray beam 606 strikes only the object 604. Many of the X-rays are transmitted through the object, interact by Compton scattering, and exit the object through the opposite surface that they entered. X-ray sensitive detector enclosures 602 are placed symmetrically around incident X-ray pencil beam to detect transmitted X-rays 610 and provide an electronic signal characteristic of the X-ray transmission.

It should be understood to those of ordinary skill in the art that any number of ionizing radiation sources may be used, including but not limited to gamma radiation, electromagnetic radiation, and ultraviolet radiation.

Detectors 602 are positioned for uniform X-ray detection on all sides of X-ray beam 606. In one embodiment, arrays of detectors 602 are placed around object 604 for uniform detection of transmitted rays 610. Detectors 602 include an enclosure capable of enclosing or "trapping" scattered rays 610. A photo-detector generates electronic signals in response to detected rays that are initially converted into light. Details about the structure and operation of several embodiments of a detector 602 are discussed in detail with respect to FIGS. 1-4 and will not be repeated herein.

In one embodiment, each detector 602 produces electronic signals which are directed to a processor. The processor analyzes the received signals and generates an image on a display means 612. The intensity at each point in the displayed image corresponds to the relative intensity of the detected transmitted X-rays. In one embodiment, X-ray source 608 communicates synchronization signals to the processor. The processor analyzes the detected signals and compares them to the synchronization signals to determine the display image. In one embodiment, display means 612 is a monitor and is employed to display graphical images signaled by the processor. Display means 612 can be any display or monitor as commonly known in the art, including a cathode ray tube monitor or an LCD monitor. In one embodiment, the digitized image displayed by display means 612 preferably consists of 480 rows by 160 columns with 8 bits per pixel.

In one embodiment, detectors 602 can move in a vertical direction while X-ray beam 606 moves in a horizontal direction by movement of X-ray source 608 in the horizontal direction. However, the placement and movement of detectors 602 and source 608 is not limited to the description provided herein. In other embodiments, detectors 602 and source 608 can be placed and moved by any method as is commonly known in the art. The intersection of x-ray beam 606 and object 604 defines an image picture element (pixel) of a specified area.

FIG. 7 illustrates one embodiment of the detector enclosure 700 of the present invention, comprising at least two screens. The dual screen detector enclosure 700 comprises three adjacent side walls which form a front side area 701, second side area 702 and third side area 703. Walls 701, 702 and 703 are connected to each other at an angle, thereby, forming an enclosure of triangular cross-section. Adjacent walls 701, 702 and 703 further form a top area 704 and a bottom area 705.

In one embodiment, the enclosure formed from adjacent walls 701, 702, 703, top area 704 and bottom area 705 is capable of receiving, but substantially not leaking electromagnetic radiation, thereby blocking the exit of incoming radiation from a radiation source.

Figure 9A:
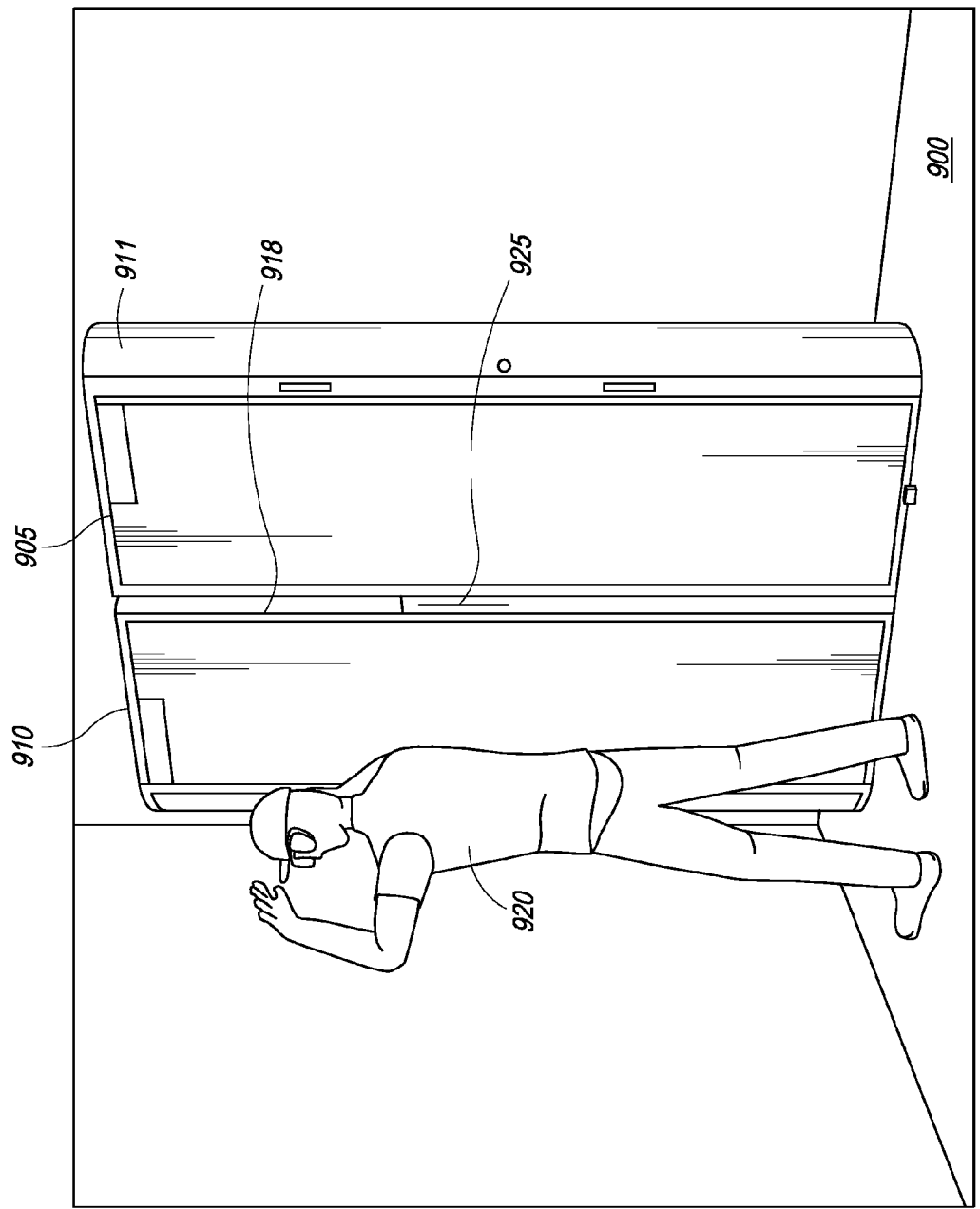
FIG. 9a shows front-side perspective view of one embodiment of a walk-by people screening system.
Figure 9B:
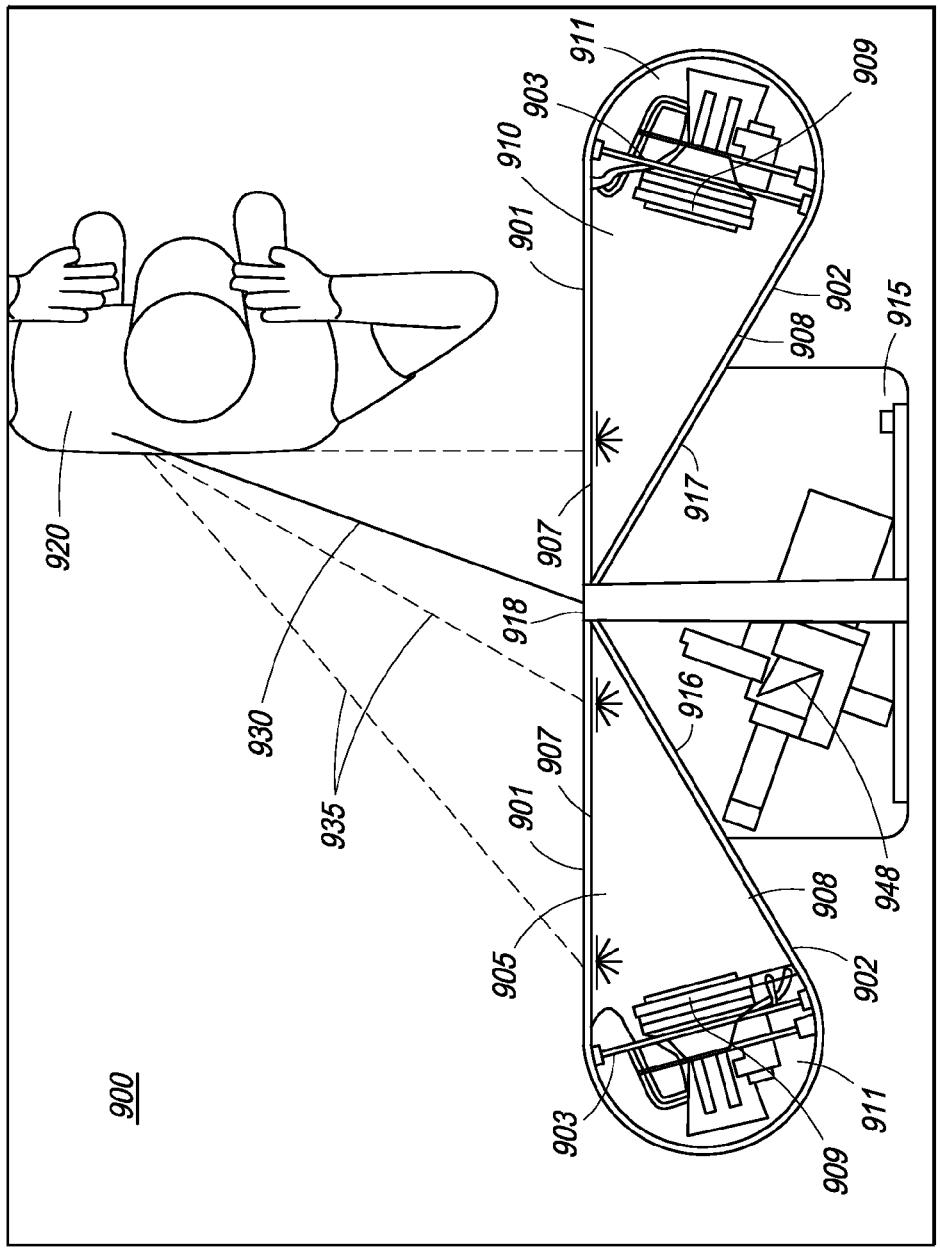
FIG. 9b shows a top cross-sectional view of the walk-by off people screening system.

In one embodiment, front side area 701 of detector enclosure 700 is used for receiving radiation 715 and thus faces the object or subject under inspection when in use in an exemplary scanning system, as described in detail with respect to FIGS. 9a and 9b. In one embodiment, front side area 701 further comprises screen 707. Second side area 702 comprises an additional screen 708 in the interior of the enclosure 700. Detector enclosure 700 further comprises a photo-detector 709, placed in the interior of the enclosure, which in one embodiment, is proximate to third side area 703. In one embodiment, the photo-detector 709 is a photomultiplier tube having a light responsive area and a non-light responsive area. Photomultiplier tubes are well-known to those of ordinary skill in the art and will not be further discussed herein.

In one embodiment, backside portion of the photomultiplier tube comprising associated electronics is enclosed in housing 710. In one embodiment, housing 710 is formed by the third side area 703 and a side 711 which has a substantially semi-circular cross-section when viewed from the top. The top and bottom sides of the substantially semi-circular housing 710 are also covered by walls. In one embodiment, the substantially semi-circular side 711 is connected, at one end, to the side area 703 by hinged joints 712 such that the side 711 can be opened with respect to the hinged end allowing for easy access to the photomultiplier electronics for inspection, repair and maintenance.

The X-rays 715 scattered from or transmitted through the subject or object under inspection first impinge upon first screen 707 of detector enclosure 700. Some of the scattered or transmitted X-rays, however, are not absorbed by first screen 707 and thus pass through first screen 707. To increase detection efficiency, detector enclosure 700 further comprises a second screen 708 in the interior of the enclosure. Second screen 708 further increase the exposure rate and thus, absorption of the scattered or transmitted X-rays 715. The overall effect of the first and second screens is an increase in the photo-detection efficiency of photomultiplier tube 709 by absorbing more electromagnetic radiation, subsequently converting that radiation to light, and thus, providing the photomultiplier tube with a stronger signal to detect.

Figure 8A:
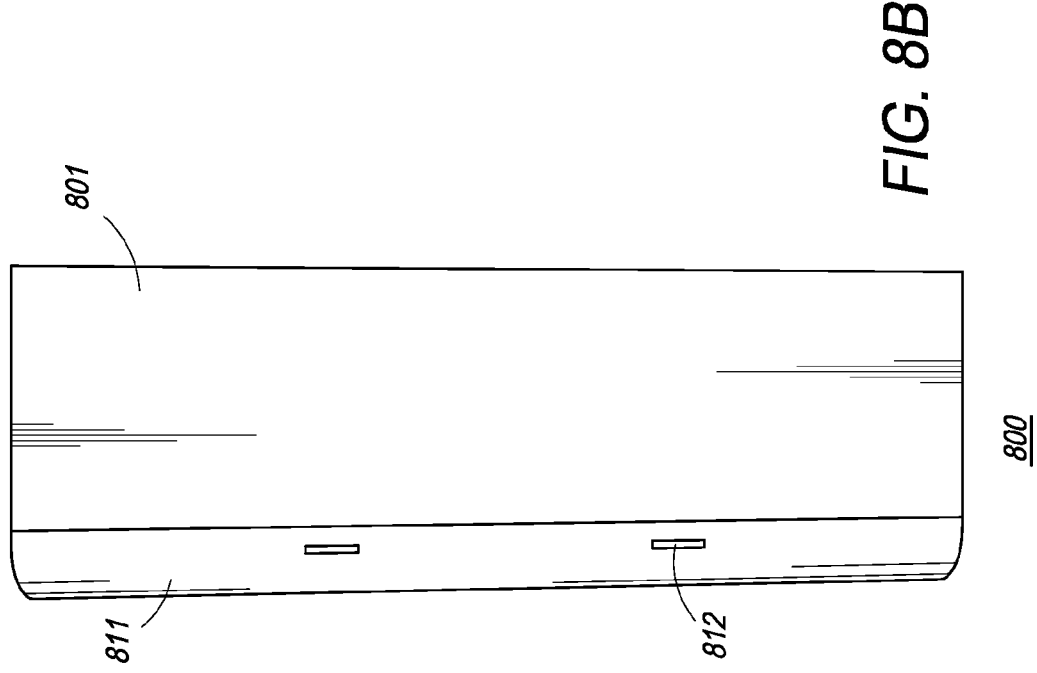
FIG. 8 shows perspective view of an embodiment of the detector enclosure of FIG. 7.
Figure 8B:
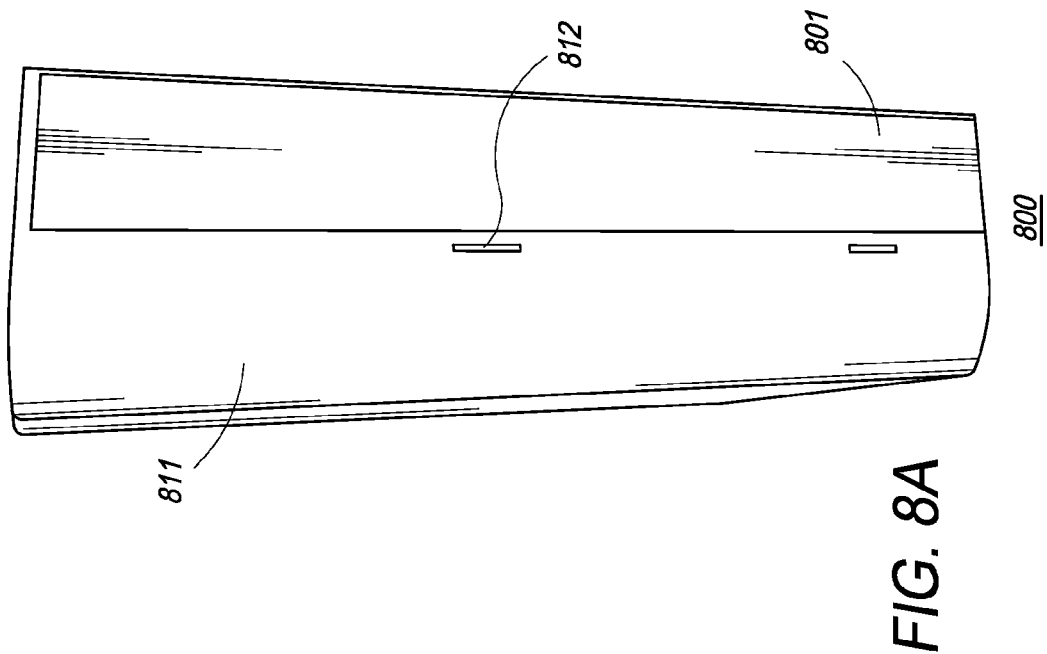

FIG. 8 shows perspective view of an embodiment of the detector enclosure 700 of FIG. 7. As shown in FIG. 8, in one embodiment, the detector enclosure is formed as a modular dual screen detector tower, cabinet or panel 800. In the current view, the front side area 801 and the substantially semi-circular side 811 are visible. The semi-circular side 811 is connected to side 801 by hinges 812. The detector towers 800, deployed in the form of cabinets or panels have an additional advantage of providing a pleasant aesthetic appearance.

FIG. 9a shows front-side perspective view of one embodiment of a scanning system 900 in which the detector enclosure 700 of FIG. 7 can be implemented. In one embodiment, the detector enclosure of the present invention is employed in a backscatter X-ray scanning system, such as but not limited to a people screening system. In one embodiment, the people screening system is embodied as a single-sided walk-by secure stand-off 900.

Persons of ordinary skill in the art should appreciate that while the walk-by secure stand-off people screening system 900 is described to illustrate the implementation of detector enclosure 700 of FIG. 7, any of the detector enclosures of the present invention can be used with the system 900 without any limitations.

FIG. 9b shows a top cross-sectional view of one embodiment of the detector screens of the system of the present invention as used in a walk-by people screening system 900. Reference will now be made to FIGS. 9a and 9b simultaneously to describe various elements of the system 900.

In one embodiment, inspection system 900 comprises first and second detector enclosures 905 and 910 respectively. In one embodiment, the detector enclosures are embodied in the form of modular dual screen detector towers 800 of FIG. 8. In alternate embodiments, the detector enclosures may comprise any number of arrangements including, but, not limited to a plurality of detector screens. As visible in FIG. 9b, the detector towers 905 and 910 comprise front side area 901, second side area 902 and third side area 903 that are connected to each other at an angle to form a triangular cross-section. The front side area 901 comprises screen 907 (or any light responsive substrate) and faces subject 920 under inspection. The second side area 902 comprises a second screen 908 (or any light responsive substrate) in the interior of the towers. Each of the towers 905, 910 comprises photomultiplier tubes 909 that are placed in the interior of the towers proximate to third side area 903. The back-end electronics of the photomultiplier tubes 909 (portion not responsive to light) is housed in the substantially semi-circular housing 911, which is connected to the two angled sides 901, 902 of the detector towers, by hinges.

A radiation source 948 is enclosed in another modular housing 915 (visible in FIG. 9b). X-ray source 948 is used to generate radiation. In one embodiment, X-ray source 948 is employed to generate a narrow pencil beam 930 of X-rays directed towards the subject 920 under examination. In one embodiment, subject 920 is a human. In one embodiment, pencil beam is formed with the integration of an X-ray tube, a mechanical chopper wheel, and a slit. It should be understood to those of ordinary skill in the art that any number of ionizing radiation sources may be used, including but not limited to gamma radiation, electromagnetic radiation, and ultraviolet radiation.

Referring to cross-sectional top view of the housing 915 in FIG. 9b, the housing 915 comprises first and second angled sides 916, 917 such that they abut and coincide with the sides 902 of the detector towers 905 and 910, when the detector towers and the radiation source housing are integrated or assembled together. A front-end side strip 918 facing the subject 920 comprises an opening 925 (visible in FIG. 9a) through which X-ray beam 930 passes before striking subject 920. Limited opening 925 aids in the reduction of electromagnetic interference and radiation noise. The side strip 918 also acts as a separator for the two detector towers such that the two detector towers are assembled symmetrically around incident X-ray pencil beam 930 to detect backscattered X-rays 935 and provide an electronic signal characteristic of the X-ray reflectance.

In one embodiment, the inspection system 900 has modular components that can be disassembled for mobility and easy transportation and then reassembled again at the site of interest. Thus, the tear drop detector towers 905, 910 and the radiation source housing 915 with associated electronics and cables are manufactured as separate modules or cabinets that can be integrated quickly to form the system 900.

During operation, as the subject 920 physically passes the detector towers 905, 910 a portion of the pencil beam 930 of X-rays that strikes the subject 920 are back-scattered, as rays 935, due to Compton scattering and impinge on the first screen 907 at the front side area 901 of the detector towers. While a portion of the scattered X-rays are detected by the first screen 907, some portion of theses get transmitted through the first screen 907 without being detected and impinge on the second screen 908 (at side 902) in the interior of the detector towers. In one embodiment approximately 30-60%, and more preferably approximately 40%, of the X-ray photons impinging the first screen 907 are detected by it while approximately 10-30%, and more preferably approximately 24%, of the X-ray photons are detected by the second screen 908. The photomultiplier tubes 909 generate electronic signals in response to detected rays that are initially converted into light. The light emitted by scintillation at screens 907, 908 is bounced around the triangular enclosures/towers 905, 910 until captured with the photomultipliers 909. Details about the structure and operation of detector towers 905, 910 are discussed in detail with respect to FIGS. 7 and 8 and will not be repeated herein.

The electronic signals produced by the two detector towers 905, 901 are directed to a processor. The processor analyzes the received signals and generates an image on a display means (not shown). The intensity at each point in the displayed image corresponds to the relative intensity of the detected scattered X-rays. In one embodiment, X-ray source 908 communicates synchronization signals to the processor. The processor analyzes the detected signals and compares them to the synchronization signals to determine the display image. In one embodiment, display means is a monitor and is employed to display graphical images signaled by the processor. Display means can be any display or monitor as commonly known in the art, including a cathode ray tube monitor or an LCD monitor. In one embodiment, the digitized scatter image displayed by display means preferably consists of 480 rows by 160 columns with 8 bits per pixel.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

We claim:

1. An inspection system for inspecting an object, comprising:
   a first detector module comprising a first side, a second side, and a third side, wherein said first, second, and third sides are connected such that the first detector module has a substantially triangular cross section;
   a second detector module comprising a first side, a second side, and a third side, wherein said first, second, and third sides are connected such that the second detector module has a substantially triangular cross section, wherein said first detector module and said second detector module are positioned adjacent each other and separated by a gap; and a radiation source configured to emit radiation through said gap.

2. The inspection system of claim 1 wherein the first side of the first detector module is connected to the second side of the first detector module to form an angle and the third side of the first detector module is a semi-circular housing attached to each of the first side and second side of the first detector module.

3. The inspection system of claim 2 wherein the semi-circular housing of the first detector module encloses a photodetector.

4. The inspection system of claim 2 wherein the first side of the second detector module is connected to the second side of the second detector module to form an angle and the third side of the second detector module is a semi-circular housing attached to each of the first side and second side of the second detector module.

5. The inspection system of claim 4 wherein the semi-circular housing of the second detector module encloses a photodetector.

6. The inspection system of claim 1 wherein an interior surface of the first side of the first detector module and an interior surface of the second side of the first detector module each comprise an active area for receiving and converting electromagnetic radiation into light.

7. The inspection system of claim 6 wherein the radiation source is an X-ray source and the system is configured to detect X-ray radiation backscattered off said object.

8. The inspection system of claim 6 wherein the active area on the interior surface of the first side of the first detector module detects 30-60% of said backscattered X-ray radiation.

9. The inspection system of claim 6 wherein the active area on the interior surface of the second side of the first detector module detects 10-30% of said backscattered X-ray radiation.

10. The inspection system of claim 6 wherein an interior surface of the first side of the second detector module and an interior surface of the second side of the second detector module comprise an active area for receiving and converting electromagnetic radiation into light.

11. The inspection system of claim 1 wherein the first side of the first detector module and the first side of the second detector module lie adjacent to each other in a same plane.

12. The inspection system of claim 1 wherein the radiation source is an X-ray source configured to emit a pencil beam of X-ray radiation through said gap.

* * * * *